United States Patent

Blazey

[11] Patent Number: 6,101,039
[45] Date of Patent: Aug. 8, 2000

[54] LENTICULAR IMAGE PRODUCT HAVING CONTACT SPOT SUPPRESSION

[75] Inventor: Richard N. Blazey, Penfield, N.Y.

[73] Assignee: Eastman Kodak Company, Rochester, N.Y.

[21] Appl. No.: 09/399,835

[22] Filed: Sep. 21, 1999

[51] Int. Cl.$^7$ .............................. G03B 21/60; G02B 27/10
[52] U.S. Cl. .......................... 359/619; 355/455; 355/456; 355/457
[58] Field of Search ................................ 355/22; 354/111; 359/619, 455–457, 452

[56] References Cited

U.S. PATENT DOCUMENTS

| | | | |
|---|---|---|---|
| Re. 35,029 | 8/1995 | Sandor et al. | 355/22 |
| 4,398,804 | 8/1983 | Yokoi | 350/337 |
| 5,598,280 | 1/1997 | Nishio | 349/57 |
| 5,808,784 | 9/1998 | Ando | 359/443 |
| 5,841,572 | 11/1998 | Ando | 359/456 |
| 5,944,405 | 8/1999 | Takeuchi | 362/31 |

*Primary Examiner*—Georgia Epps
*Assistant Examiner*—Michael A Lucas
*Attorney, Agent, or Firm*—William F. Noval

[57] ABSTRACT

A lenticular image product comprising: a support; a composite image printed on the support; a printed pattern of substantially invisible lines printed over the composite image; and a lenticular lens element overlaying the printed pattern, wherein the printed pattern spaces the lenticular lens element from the printed composite image to prevent the formation of contact spots which produce image degradation.

7 Claims, 3 Drawing Sheets

LENTICULAR IMAGE PRODUCT HAVING CONTACT SPOT SUPPRESSION

FIELD OF THE INVENTION

This invention relates in general to lenticular imaging systems and more particularly to a lenticular image product having contact spot suppression.

BACKGROUND OF THE INVENTION

Lenticular image products include a lenticular lens element having parallel lenticules with cylindrical lens and a composite image viewed through the lenticular lens element. The composite image includes a plurality of images which are interleaved so that a set of slices of each image are viewed through each lenticule. By moving the lenticular image product relative to a viewer, sequential images are brought into view. The views can represent depth images, dynamic images, flip images, as well as other image effects.

The lenticular image product can be produced using a number of techniques. The lenticular lens element can have a photosensitive layer which is exposed either from the front through the lenticules or from the back using scan printing or contact printing techniques. The composite image can be formed on a film which is assembled with a lenticular lens element to produce the lenticular image product. In another process, the composite image is thermally printed on a support and a lenticular lens element is combined with it. In such case, the thermal image is often so close in contact with the back of the lenticular lens element that optical contact between the surfaces can develop. This produces "contact" spots which show up as shiny puddles when the lenticular image is viewed in reflection or at glancing incidence.

In order to prevent the spots, a means must be found to prevent intimate optical contact from forming. There are many ways that this might be done, such as introducing something between the surfaces such as matte beads, roughening one of the surfaces, putting a spacer between the surfaces, etc. U.S. Pat. No. 4,398,804, issued Aug. 16, 1983, inventor Yokoi, discloses a spacer used in a liquid crystal display unit and U.S. Pat. No. Re. 35,029, issued Aug. 29, 1995, inventors Sandor et al. discloses a spacer used in a computer generated autostereography method which do not provide solutions to this problem.

Most of these solutions have undesirable side effects, such as decreasing image sharpness, causing dust problems, adding cost, etc.

SUMMARY OF THE INVENTION

According to the present invention, there is provided a solution to the problems of the prior art.

According to a feature of the present invention, there is provided a lenticular image product comprising: a support; a composite image printed on the support; a printed pattern of substantially invisible lines printed over the composite image; and a lenticular lens element overlaying the printed pattern, wherein the printed pattern spaces the lenticular lens element from the printed composite image to prevent the formation of contact spots which produce image degradation.

ADVANTAGEOUS EFFECT OF THE INVENTION

The invention has the following advantages.

1. Contact spots are eliminated between a lenticular lens element and a printed composite image in a lenticular image product.

2. Undesirable side effects, such as decreasing image sharpness, dust problems, and added cost are minimized.

DETAILED DESCRIPTION OF THE INVENTION

Figure 1:
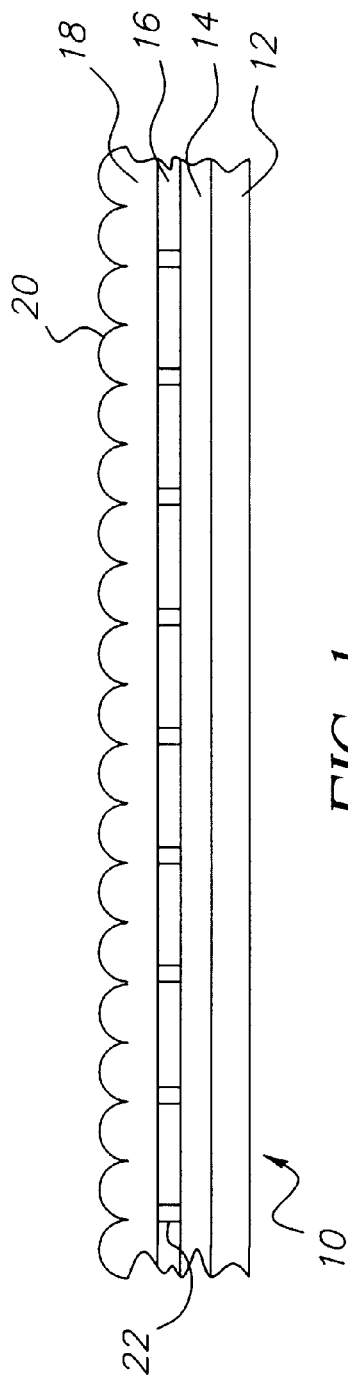
FIG. 1 is a sectional view of a lenticular image product according to the present invention.

FIG. 1 shows an elevational view of a lenticular image product incorporating an embodiment of the present invention. As shown, lenticular image product 10 includes a support 12, a composite image printed layer 14, a printed spacer layer 16, and lenticular lens element 18. Composite image printed layer 14 is printed on support 12 by means of one of several techniques, including thermal, ink jet, electrographic, offset, etc. The composite image is formed of several images, each of which has been decomposed into strips numbering the number of lenticules in lenticular lens element 18. A set of strips corresponding to the number of images are located relative to each lenticule, all of the strips interleaved together to form the composite image. Lenticular lens element 18 includes a number of parallel lenticules 20, including longitudinally extending cylindrical lenses.

According to the invention, a grid-like spacer layer 16 is printed on composite image layer 14 to prevent contact between layer 14 and lenticular lens element 18. Layer 14 prevents formation of image degrading contact spots. Spacer layer 16 includes a grid pattern printed over one of the interleaved images of the composite image. This grid is made up of thin lines 22 one or two pixels wide spaced fairly far apart as in a rectangular grid. Alternatively, the grid may be rotated 45 degrees from the vertical to decrease its visibility.

The problem with these grids is that if they are visible they add an undesirable artifact to the image. However, the grids need not be visible. By making use of the eye's insensitivity to certain colors and spatial frequencies, the grid can be made essentially invisible.

One means of doing this is by printing the grid in only one frame of the lenticular composite image and printing it only in yellow lines one pixel wide. This yellow grid is totally invisible to the observer. If it is necessary to increase the width of the grid lines so that they do become visible (for example, if one pixel wide lines do not completely eliminate contact spots) one can alter the spacing of the grids such that it falls in the range of spatial frequencies where the eye is insensitive.

Figure 2B:
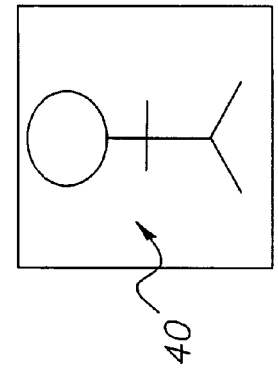
FIGS. 2a and 2b are diagrammatic views illustrating the present invention.
Figure 2A:
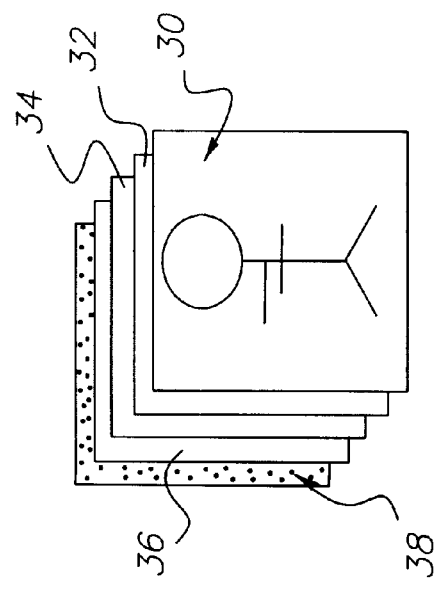

FIG. 2 is a diagrammatic view illustrating the invention. As illustrated in view A, for a thermally printed composite image, the composite image (as shown from one viewpoint) includes cyan, magenta, yellow, and black images 30,32,34, 36 printed on top of each other. Grid image 38 is printed on top of image 36 View B illustrates the composite image 40 formed from images 30–38.

Figure 3:
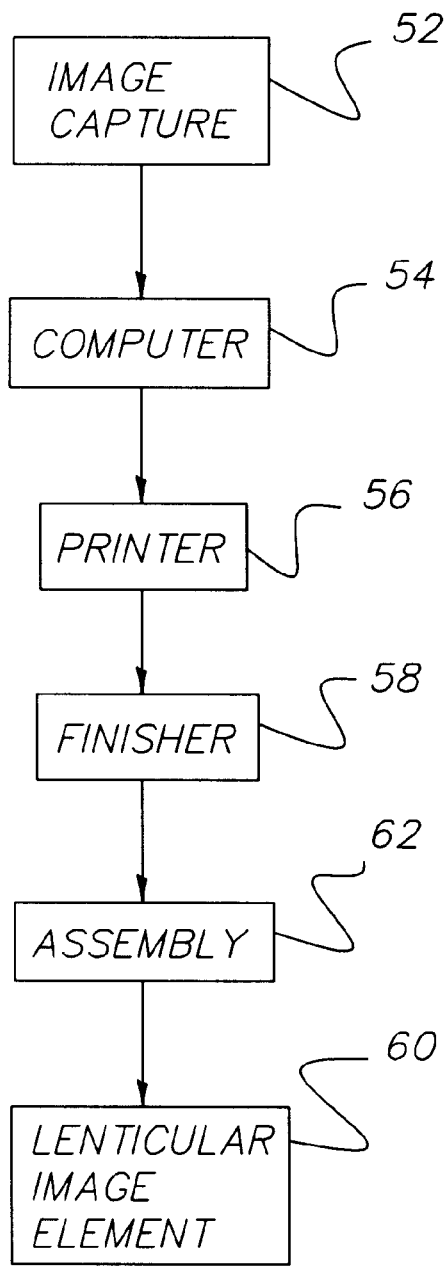
FIG. 3 is a block diagram of a system for producing lenticular image product incorporating the present invention.

FIG. 3 shows a system for producing a lenticular image product, including the present invention. The system 50 includes image capture system 52 which captures a sequence of images from a video camera (motion) or from a digital still camera (depth), or from any other source of actual or computer generated images. Computer 54 decomposes the captured images into slices, creates intermediate frames, if desired, and interleaves the sliced images to form a composite image. Printer 56 prints the composite image onto support. Printer 56 also prints the spacer image on top of the composite image. Printer 56 is preferably a thermal printer. Finisher 58 cuts the printed image to the dimensions of the lenticular lens element supplied by source 60. The assembly system 62 combines the composite image with the lenticular lens element to form a lenticular image product.

Figure 4:
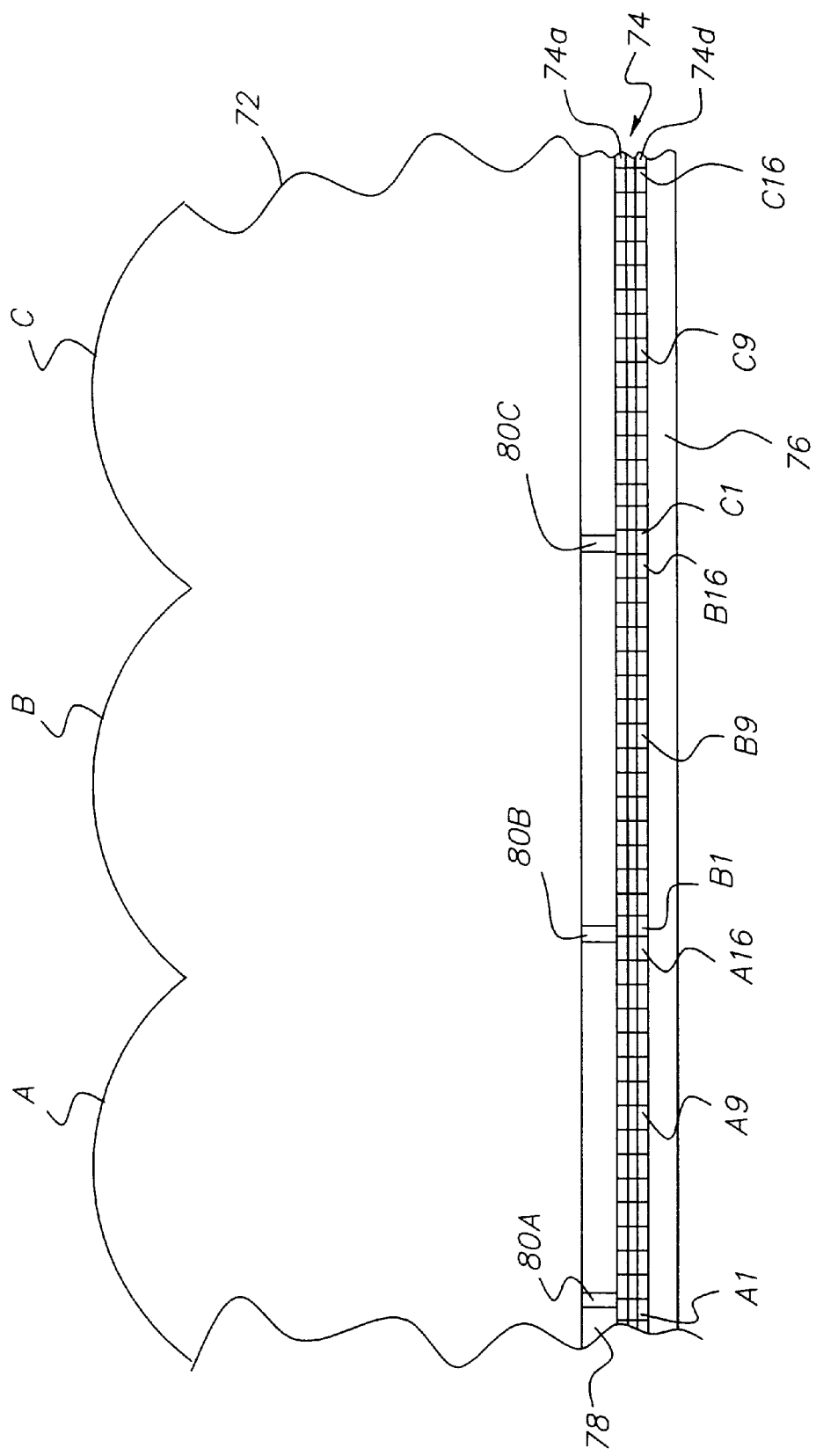
FIG. 4 is a sectional view of an embodiment of the present invention.

FIG. 4 shows in greater detail an embodiment of the present invention. As shown, lenticular image product 70 includes lenticular lens element 72 having lenticules A, B, C. Composite image layer 74 includes printed cyan, magenta, yellow and black layers 74a–74d. Under each lenticule is a set of image strips, A1–A16, B1–B16, C1–C16, one strip for each of sixteen images 1–16. Composite image 74 is printed on support 76. It will be understood that 16 images is exemplary only and that any number of images can be used.

Grid layer 78 is printed on layer 74 and includes spaced lines 80A, 80B, 80C for spacing lenticular element 72 from composite image layer 74. Formation of contact spots is thereby prevented.

The invention has been described in detail with particular reference to certain preferred embodiments thereof, but it will be understood that variations and modifications can be effected within the spirit and scope of the invention.

PARTS LIST

| | |
|---|---|
| 10 | lenticular image product |
| 12 | support |
| 14 | composite image printed layer |
| 16 | printed spacer layer |
| 18 | lenticular lens element |
| 20 | parallel lenticules |
| 22 | lines |
| 30,32,34,36 | cyan, magenta, yellow and black images |
| 38 | grid image |
| 40 | composite image |
| 50 | system |
| 52 | image capture system |
| 54 | computer |
| 56 | printer |
| 58 | finisher |
| 60 | source |
| 62 | assembly system |
| 70 | lenticular image product |
| 72 | lenticular element |
| 74 | composite image |
| 74a–74d | R,G,B, and black layers |

What is claimed is:

1. A lenticular image product comprising:
    a support;
    a composite image printed on said support;
    a printed pattern of substantially invisible lines printed over said composite image; and
    a lenticular lens element overlaying said printed pattern, wherein said printed pattern spaces said lenticular lens element from said printed composite image to prevent the formation of contact spots which produce image degradation.

2. The lenticular image product of claim 1 wherein said composite image is thermally printed on said support.

3. The lenticular image product of claim 1 wherein said printed pattern is a rectangular grid of substantially invisible lines.

4. The lenticular image product of claim 1 wherein said composite image includes a plurality of images which are interleaved and wherein said printed pattern includes a pattern of lines in one of said interleaved images.

5. The lenticular image product of claim 1 wherein said printed pattern is in a color to which the human eye is insensitive.

6. The lenticular image product of claim 5 wherein said color is yellow.

7. The lenticular image product of claim 1 wherein said printed pattern of lines have line spacings which are in the range of spatial frequencies to which the human eye is insensitive.

* * * * *